H. S. BLAIR.
CORN HUSKER.
APPLICATION FILED JAN. 31, 1908.
917,527.
Patented Apr. 6, 1909.
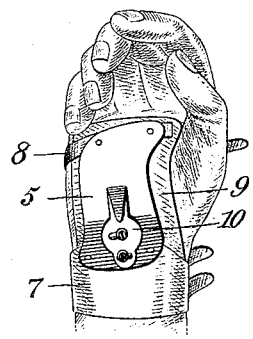
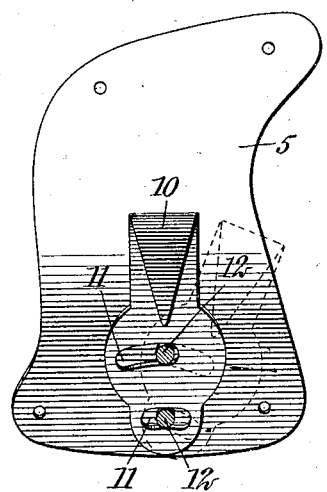
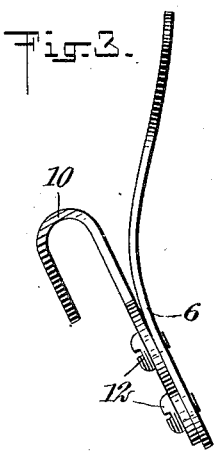
WITNESSES
INVENTOR
Herbert S. Blair
BY
ATTORNEYS

UNITED STATES PATENT OFFICE.

HERBERT S. BLAIR, OF BUCYRUS, OHIO.

CORN-HUSKER.

No. 917,527.  Specification of Letters Patent.  Patented April 6, 1909.

Application filed January 31, 1908.  Serial No. 413,519.

*To all whom it may concern:*

Be it known that I, HERBERT S. BLAIR, a citizen of the United States, and a resident of Bucyrus, in the county of Crawford and State of Ohio, have invented a new and Improved Corn-Husker, of which the following is a full, clear, and exact description.

This invention is an improvement in corn huskers, belonging to that class of huskers which is made as an attachment for the hand and embodies a hook for engaging the husks and stripping them from the ear.

The object of the invention is to so connect the hook with the palm plate, that it may be moved from side to side and turned to varying angular positions within certain limits and secured to the plate in any position of its adjustment within these limits, whereby it may be relatively disposed on the palm plate to suit the particular motion of the user.

Reference is to be had to the accompanying drawings forming a part of this specification, in which similar characters of reference indicate corresponding parts in all the views.

Figure 1 is a perspective view showing a corn husker embodying my invention, as applied to the hand; Fig. 2 is an enlarged face view of the same partly in section, with the strips removed; and Fig. 3 is an edge view of the palm plate and husking hook shown in Fig. 2.

In the construction of my improved corn husker I preferably use a palm plate 5 of the well-known shape shown to suitably conform to the palm of the hand, and having an angular transverse bend intermediate its length, as indicated at 6 in Fig. 3, for receiving the ball of the hand. At the bottom and top edges of the plate it is respectively riveted or otherwise suitably secured to a wrist strap 7 and a palm strap 8, the last mentioned strap passing through a slit in a flap 9, which forms a protective covering for the hand underneath the plate, and is extended to and attached to the wrist strap.

Below the angular bend 6 in the plate is adjustably connected a husking hook 10, the adjustment being effected by forming two laterally-spaced slots 11 in the shank of the hook and passing through each of them a screw 12, which is threaded into the palm plate. The upper slot 11 in the hook is preferably formed on an arc in which the lower screw is the center, whereby it may be turned to any angular position within certain limits, and may also be shifted from side to side with respect to the plate and be secured in any position of its adjustment. This enables the adjustment to be made with minuteness to suit the notion of the most exacting user, which I regard as a principal feature of the invention.

While I have shown and described the preferred form of my invention in detail, I nevertheless recognize that changes may be resorted to falling within the scope of the claims annexed.

Having thus described my invention, I claim as new and desire to secure by Letters Patent:

1. A corn husking attachment comprising a palm plate and a husking hook, one of which has laterally extending spaced slots curving in one direction, and the other having threaded openings, and screws passing through said slots and threaded in the said openings, connecting the plate and hook together, whereby the hook is adjustable as a whole laterally and in angular positions with respect to the plate within the limits of said slots.

2. A corn husking attachment for the hand, comprising a palm plate, a husking hook having laterally-extending spaced slots in its shank curving in one direction, and screws for holding the hook in adjusted position on the plate, passing through said slots.

In testimony whereof I have signed my name to this specification in the presence of two subscribing witnesses.

HERBERT S. BLAIR.

Witnesses:
 EDUARD CERITS,
 WALTER A. ZELLNER.